United States Patent
Mauritz et al.

(10) Patent No.: US 8,744,022 B2
(45) Date of Patent: Jun. 3, 2014

(54) GLITCH MITIGATION IN A RADIO RECEIVER

(75) Inventors: Oskar Mauritz, Johanneshov (SE); Mats Åhlander, Täby (SE); Fredrik Huss, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 69 days.

(21) Appl. No.: 13/515,982

(22) PCT Filed: Dec. 18, 2009

(86) PCT No.: PCT/SE2009/051457
§ 371 (c)(1),
(2), (4) Date: Jun. 14, 2012

(87) PCT Pub. No.: WO2011/075024
PCT Pub. Date: Jun. 23, 2011

(65) Prior Publication Data
US 2012/0257696 A1    Oct. 11, 2012

(51) Int. Cl.
*H04L 27/00* (2006.01)
(52) U.S. Cl.
USPC ........... 375/345; 375/316; 375/346; 375/259; 375/340; 375/342
(58) Field of Classification Search
USPC .......... 375/345, 316, 346, 259, 285, 340, 342
See application file for complete search history.

(56) References Cited

U.S. PATENT DOCUMENTS

| 6,446,236 B1 * | 9/2002 | McEwen et al. ............... 714/795 |
| 7,315,578 B2 | 1/2008 | Cheng |
| 7,395,491 B2 * | 7/2008 | Chen ............................ 714/780 |
| 8,286,051 B2 * | 10/2012 | Chiou et al. .................. 714/755 |
| 8,582,700 B2 | 11/2013 | Hagen et al. |
| 2004/0014450 A1 | 1/2004 | Yamamoto et al. |
| 2005/0129151 A1 | 6/2005 | Kobayashi et al. |
| 2008/0130799 A1 * | 6/2008 | Yousef et al. ................. 375/345 |
| 2008/0165904 A1 | 7/2008 | Sidi et al. |

OTHER PUBLICATIONS

International Search Report for PCT/SE2009/051457 mailed Sep. 20, 2010.
G. Clark et al., "Error-Correction Coding for Digital Communications", Applications of Communications Theory Series, Section 8.4, 1981, 3 pages.

* cited by examiner

*Primary Examiner* — Siu Lee
(74) *Attorney, Agent, or Firm* — Nixon & Vanderhye P.C.

(57) ABSTRACT

A basic idea is to determine (S1) occurrence of a glitch caused by operation of the AGC mechanism, identify (S2) those modulation symbols in a digitized version of the received signal that are affected by the glitch, each modulation symbol represented by a number of bits in combination, and then reduce (S3), for each of the identified modulation symbols, the contribution in representing the identified modulation symbol as provided by at least a subset of the bits of the modulation symbol. In this way, the adverse effects of the glitch can be effectively mitigated and subsequent detection of the desired signal can be significantly improved. This also means that the link performance will be significantly improved.

25 Claims, 12 Drawing Sheets

GLITCH MITIGATION IN A RADIO RECEIVER

This application is the U.S. national phase of International Application No. PCT/SE2009/051457 filed 18 Dec. 2009 which designated the U.S. the entire contents is hereby incorporated by reference.

TECHNICAL FIELD

The present invention generally relates to radio communications technology, and more particularly to a method and device for glitch mitigation in a receiver, as well as a radio receiver.

BACKGROUND

In radio communication technologies, blocking and interference are some of the main sources for system performance degradation. They can for example occur when an interfering signal, having a center of frequency different from the desired signal carrier frequency is very strong.

Many receivers, such as for wideband radio, employ a so-called Automatic Gain Control (AGC) mechanism for regulating the dynamic range of the received signals, for example in order to prevent saturation of the receiver when a strong signal is present. The received signal power can be measured at a suitable location in the receiver and the gain of a Variable Gain Amplifier (VGA) may then be controlled based on the power measurements. In particular, the AGC mechanism provides means to temporarily reduce the gain of a variable amplifier in case strong interfering signals are received.

However, when the AGC mechanism is turned on or off, or when a gain adjustment is effectuated, unwanted transient signals are generated. These transients can be highly energetic, and introduce non-linear distortions, commonly called glitches, in the useful part of the desired signal. The desired signal is thereby heavily distorted and a number of samples of the digital received signal are corrupted. The result is a loss of link performance. When the code rate is very high, just a few bit errors will result in block or frame errors, and the performance loss in terms of block or frame error rates can be very large. Glitches also affect voice services, and they also result in some performance loss.

SUMMARY

It is a general object to provide efficient mitigation of glitches in a radio receiver having an automatic gain control (AGC) mechanism for regulating the dynamic range of the received signal.

It is a specific object to provide a method for glitch mitigation in a receiver having an automatic gain control (AGC) mechanism.

It is another specific object to provide a device for glitch mitigation in a receiver having an automatic gain control (AGC) mechanism.

Yet another object is to provide an improved radio receiver.

These and other objects are met by embodiments as defined by the accompanying patent claims.

A basic idea according to a first aspect is to determine occurrence of a glitch caused by operation of the AGC mechanism, identify those modulation symbols in a digitized version of the received signal that are affected by the glitch, each modulation symbol represented by a number of bits in combination, and then reduce, for each of the identified modulation symbols, the contribution in representing the identified modulation symbol as provided by at least a subset of the bits of the modulation symbol.

In this way, the adverse effects of the glitch can be effectively mitigated and subsequent detection of the desired signal can be significantly improved. This also means that the link performance will be significantly improved.

According to a second aspect there is provided a device for glitch mitigation in a receiver having an automatic gain control (AGC) mechanism for regulating the dynamic range of the received signal. The device comprises a determiner configured to determine occurrence of a glitch caused by operation of the AGC mechanism, and a symbol identifier configured to identify those modulation symbols in a digitized version of the received signal that are affected by the glitch, each modulation symbol represented by a number of bits in combination. The device further comprises a reducer configured to reduce, for each of the identified modulation symbols, the contribution in representing the identified modulation symbol as provided by at least a subset of the bits of the modulation symbol.

There is also provided a radio receiver including such a device for glitch mitigation.

Other advantages offered by the invention will be appreciated when reading the below description of embodiments of the invention.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

It may be useful to begin with a brief overview of some basic aspects of radio receiver technology.

Figure 1:
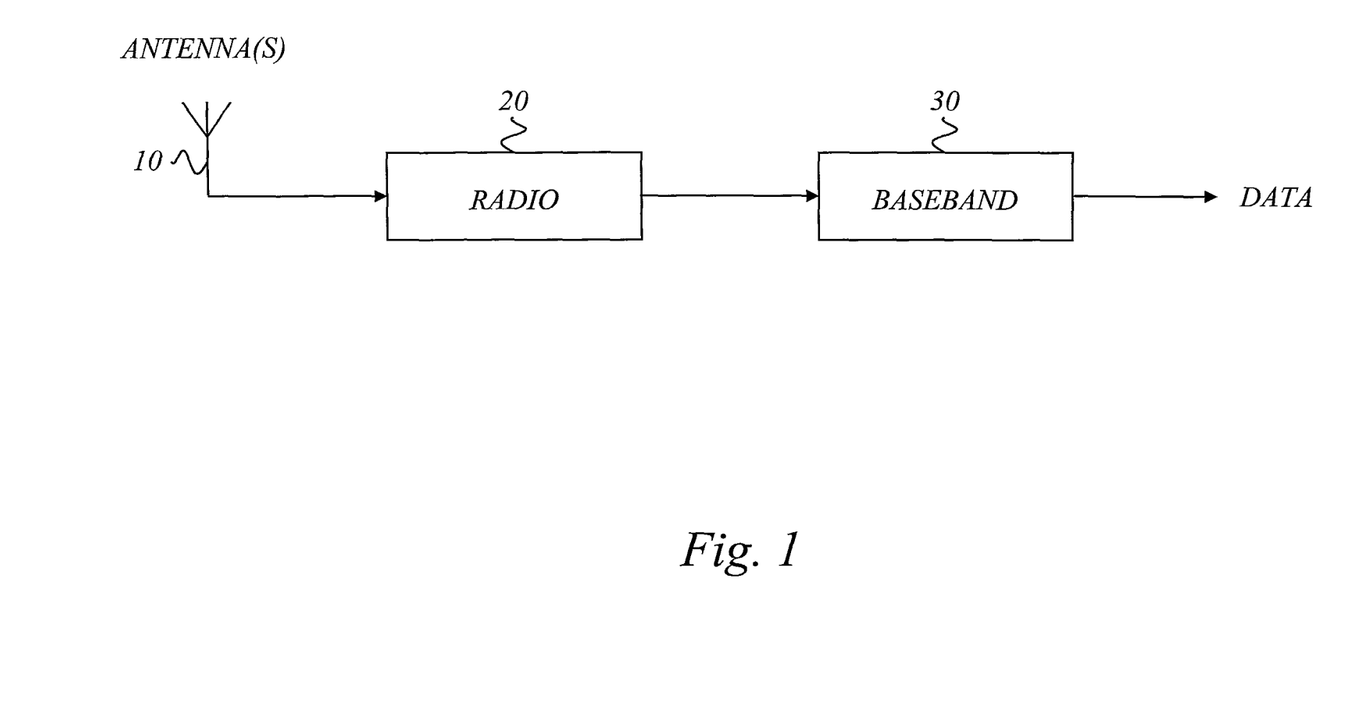
FIG. 1 is a schematic overview of an exemplary radio receiver.

In a digital radio communications system, a receiver typically includes one or more antennas 10, a radio part 20 and a baseband part 30, as schematically illustrated in FIG. 1. The receiver generally also includes an analog part and a digital part (not explicitly shown in FIG. 1), using an Analog-to-Digital Converter (ADC) for converting analog signals into digital signals.

Figure 2:
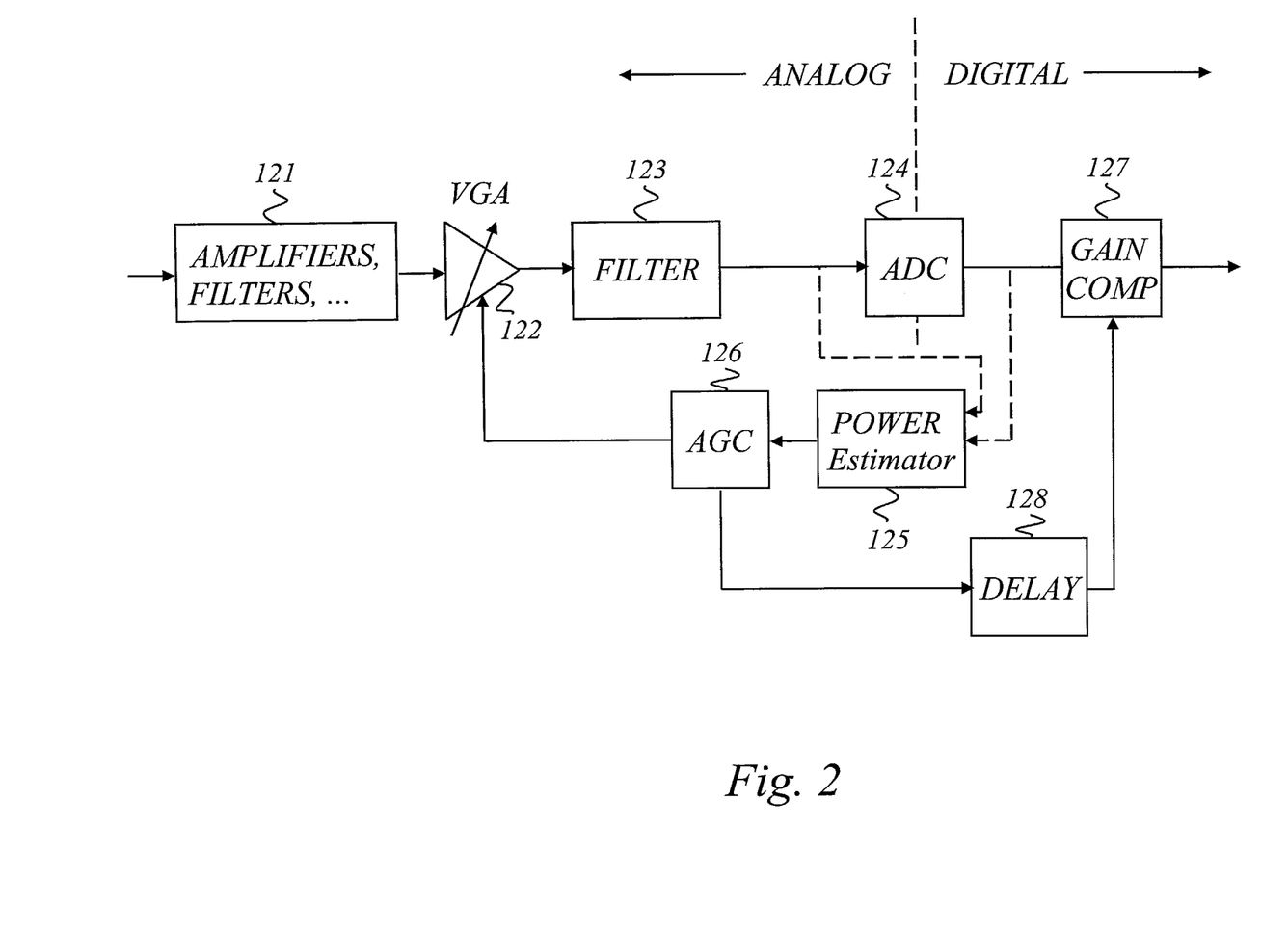
FIG. 2 is a schematic block diagram illustrating an example of some functional units relevant for the AGC mechanism in a radio receiver.

FIG. 2 is a schematic block diagram illustrating an example of some functional units relevant for the AGC mechanism in a radio receiver. In this example, the functional units include amplifiers, analog filters and mixers 121, a VGA amplifier 122, one or more additional filters 123, an ADC 124, a power estimator 125, and an AGC controller 126, a gain compensator 127 and a delay unit 128.

The received signal is passed through the analog part of the radio receiver including amplifiers, analog filters and/or mixers 121. For the purpose of regulating the dynamic range of the received signals, for example in order to prevent saturation of the receiver when a strong signal is present, the received signal is forwarded to the VGA amplifier 122, the gain of which is controlled by the AGC controller 126 based on power measurements made by the power estimator 125. For example, the signal power can be measured before or after the ADC 124. Alternatively, the power measurements of the received signal may be performed earlier in the analog radio chain. It is even possible to estimate the power of the received signals at several locations, if desired.

Figure 3A:
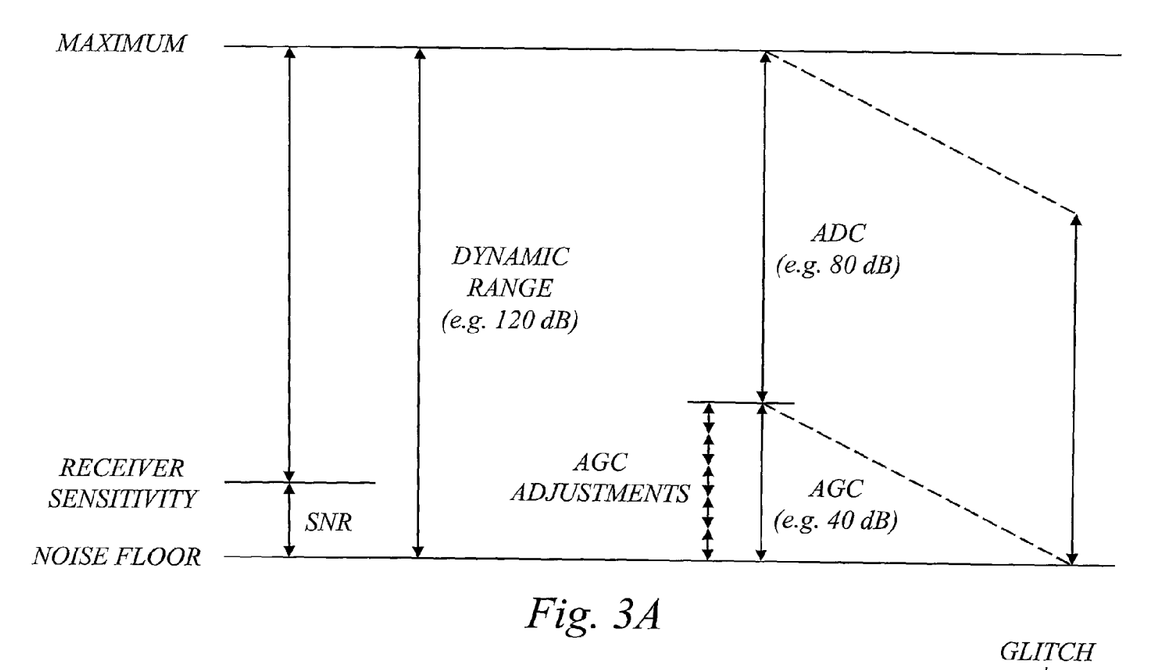
FIG. 3A is a schematic diagram illustrating dynamic ranges of a receiver, an ADC and the relevance of the AGC mechanism.

The dynamic range is normally defined as the range between the noise floor of a device and its specified maximum input level. With reference to the schematic example of FIG. 3A, the dynamic range of the received signals may be e.g. 120 dB, whereas the ADC has a limited dynamic range, e.g. 80 dB. By employing the overall AGC mechanism (e.g. 40 dB) it is possible to regulate the dynamic range of the received signals. It is important that the gain of the VGA amplifier is customized for the typical powers of the received signals and the range of the ADC. Normally, the gain of the VGA amplifier may be adjusted in steps; so-called gain adjustments or AGC adjustments.

Figure 3B:
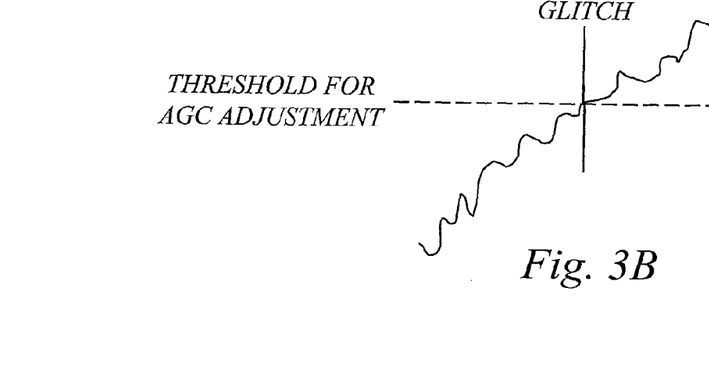
FIG. 3B illustrates an example of the occurrence of a glitch caused by the AGC operation.

In order for the receiver to work properly, the gain adjustment is normally compensated after the ADC, so-called gain compensation by the gain compensator 127. However, if there are filters 123 between the VGA amplifier 122 and the ADC 124, the gain will not be perfectly compensated but there will be transients (so-called AGC glitches) within a very short time after a gain adjustment, as illustrated in FIG. 3B.

When the code rate is high, just a few bit errors will result in block or frame errors, and the performance loss in terms for block or frame error rates can be very large.

One way to mitigate AGC glitches is glitch suppression as described in co-pending patent application [1], which is incorporated herein by reference. In glitch suppression the idea is to set the gain to zero in the gain compensation or thereafter during the glitch. This partly reduces the error in the signal caused by the transients if the transients are significantly stronger than the wanted signal. In other words, the samples $y_n$ of the signal are set to zero for $n=n_0, \ldots, n_0+L-1$, where L is fixed and $n_0$ is given by the time instant for the glitch. The set of samples set to zero usually correspond to an interval of a few microseconds.

Although glitch suppression mitigates glitches for lower order modulation schemes such as QPSK, this is generally not the case for higher order modulation schemes.

Figure 4:
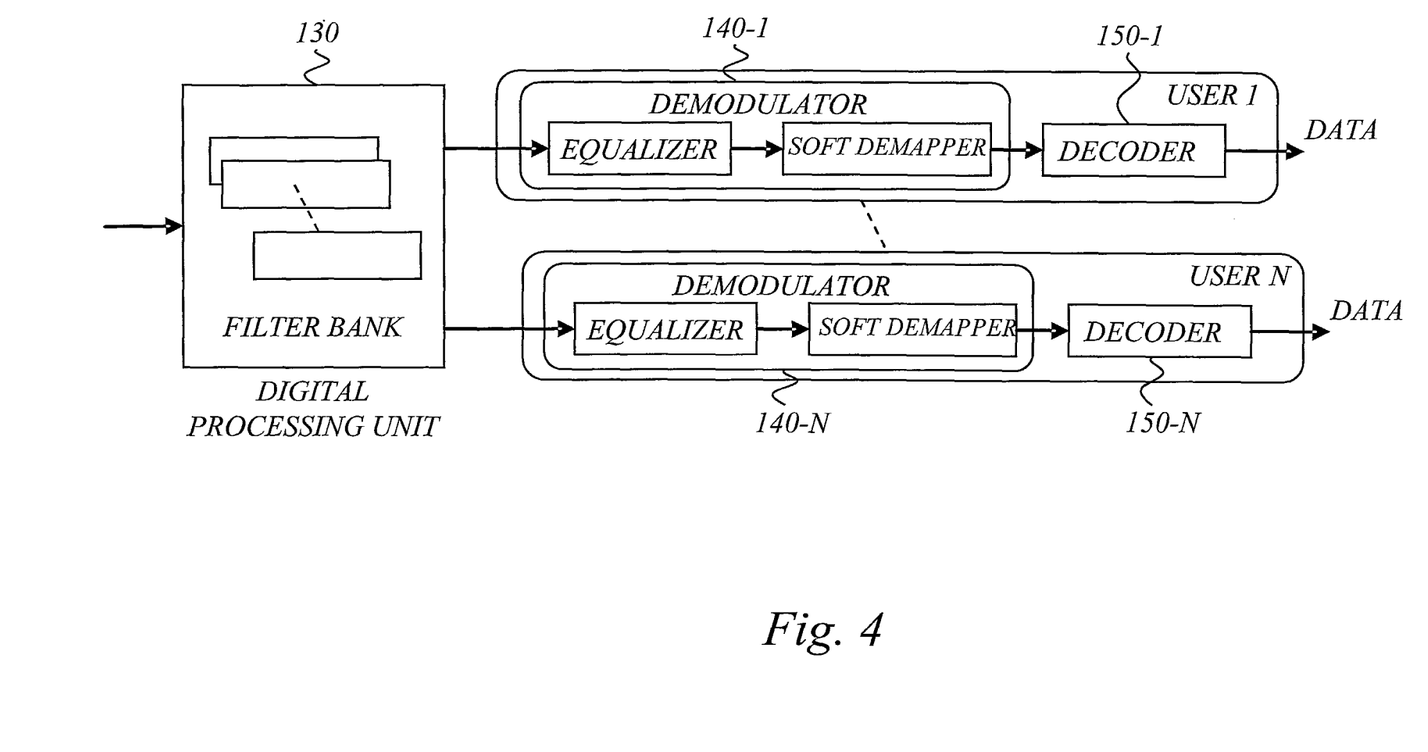
FIG. 4 is a schematic diagram illustrating an example of the baseband structure of a radio receiver.

This can be explained as follows:

After gain compensation the digital signal is normally subject to further filtering in the baseband part of the receiver, as illustrated in FIG. 4.

FIG. 4 is a schematic diagram illustrating an example of the baseband structure of a radio receiver. If N wanted signals are received simultaneously, where N corresponds to the number of users (one wanted signal per user), the signals may be processed in parallel using filter banks in the digital processing unit 130. The plurality of signals may be jointly demodulated, and demodulated soft or hard bits, depending on the desired implementation, from the demodulators 140-1 to 140-N may then be sent for decoding in the respective decoders 150-1 to 150-N.

The filters and the equalizers may spread the distortion of the glitch suppression in time but basically some received modulated symbols $z_m$ after the equalizer will have small amplitude, because of the glitch suppression.

In the soft demapper, each received complex-valued modulated symbol $z_n$ is mapped on soft values, $s_{Mn+k}$, $k=0,1,\ldots,M-1$, where M is the number of bits per symbol. The soft value, $s_b$, for bit b is defined to be positive if it is more likely that b=0 than b=1 and negative otherwise. The higher reliability of the bit, the higher is the absolute value of the soft value.

Figure 5:
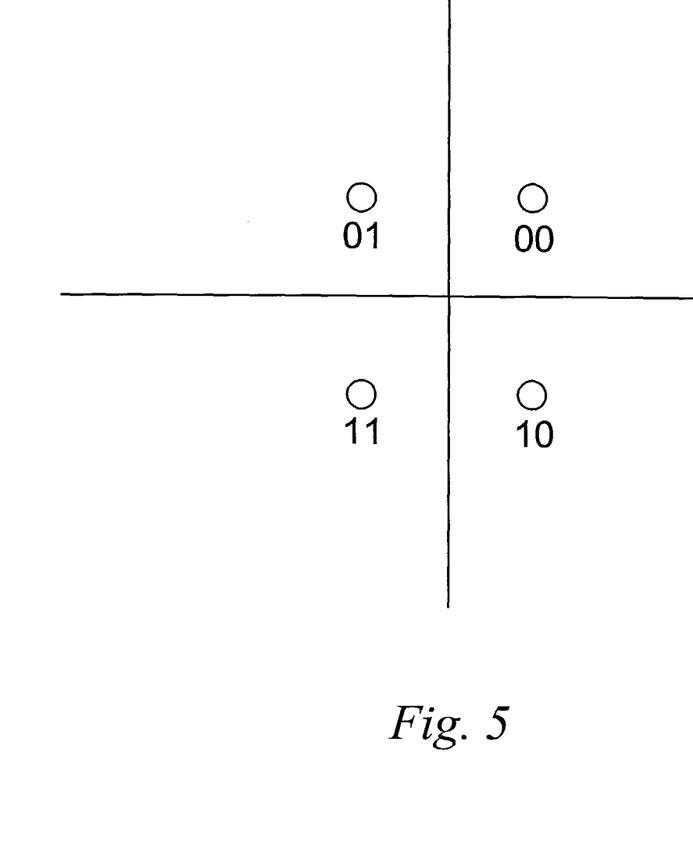
FIG. 5 is an exemplary constellation diagram for QPSK (Quadrature Phase-Shift Keying).

For QPSK (M=2) the soft values are given by $$s_{2n}=x_n$$

$$s_{2n+1}=y_n$$

where $x_n$ and $y_n$ are the real and imaginary parts of the received complex symbol n depending on the Signal-to-Noise Ratio (SNR), see e.g. [2]. FIG. 5 illustrates an exemplary constellation diagram for QPSK. If the amplitude of $z_n$ is small due to glitch suppression, the amplitude of the corresponding soft values will also be small and the bits will be considered unreliable and the glitch will only have a small impact on the decoding, which is good.

As well known, a constellation diagram is a representation of a signal modulated by a digital modulation scheme. It displays the signal in a two-dimensional scatter diagram and represents the possible symbols that may be selected by a given scheme as points in the complex plane. For example, the demodulator may select, as its estimate of the transmitted symbol, that point which is closest to the received signal. In amplitude modulation schemes the amplitude is the basic information carrier. Each modulation symbol of a constellation point is here represented by a number of bits in combination.

Figure 6:
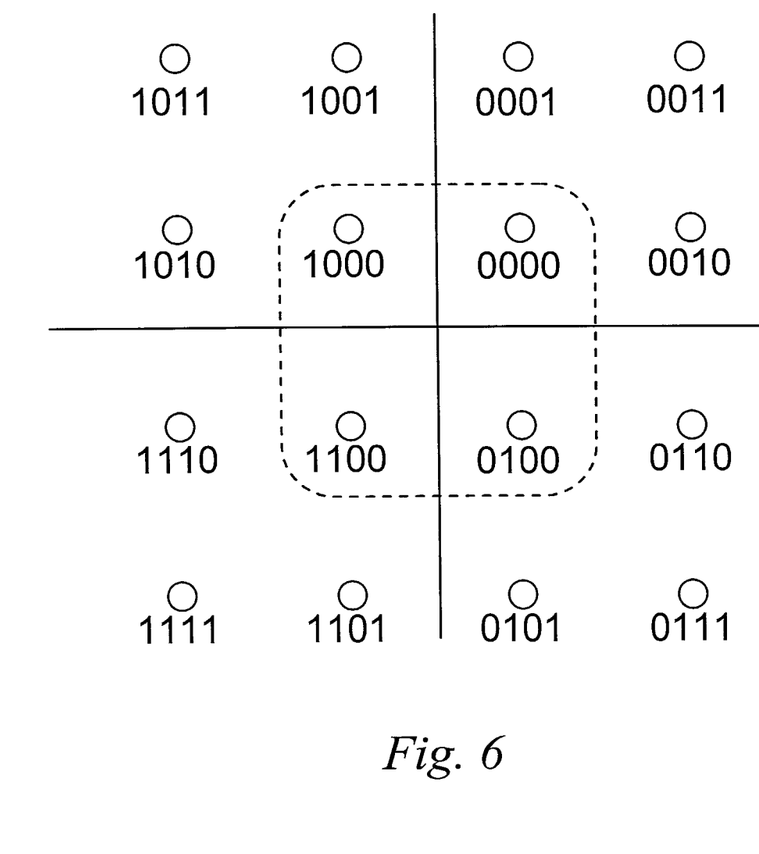
FIG. 6 is an exemplary constellation diagram for 16 QAM (Quadrature Amplitude Modulation).

For QAM, for example, the constellation points closest to the origin will normally only differ in the first two bits, see for example the signal constellation for 16QAM in FIG. 6, where all the constellation points closest to the origin (inside the dashed line) correspond to the third and fourth bits being zero. Consequently, the soft values of the third and fourth bits will for glitch suppression have a large amplitude and the bits will erroneously be considered reliable or—for high SNR—even very reliable and will thus substantially degrade the performance of the decoder.

As an alternative, or a complement, to glitch suppression, it is therefore proposed to determine the occurrence of a glitch caused by operation of the AGC mechanism, and identify those modulation symbols that are affected by the glitch, and then reduce, for each of the modulation symbols affected by the glitch, the contribution in representing the modulation symbol as provided by at least a subset of the bits of the modulation symbol.

For example, the absolute value of the corresponding soft value(s) of at least a subset of the bits of each identified, affected modulation symbol may be reduced. Alternatively, the relevant bit or bits of an affected modulation symbol may simply be erased.

In this way, the adverse effects of the glitch can be effectively mitigated and subsequent detection/decoding of the desired signal can be significantly improved. This also means that the link performance will be significantly improved.

The invention may for example be used as a complement to so-called glitch suppression techniques, including any processing of the glitch that involves damping part of the received signal affected by the glitch.

Figure 7:
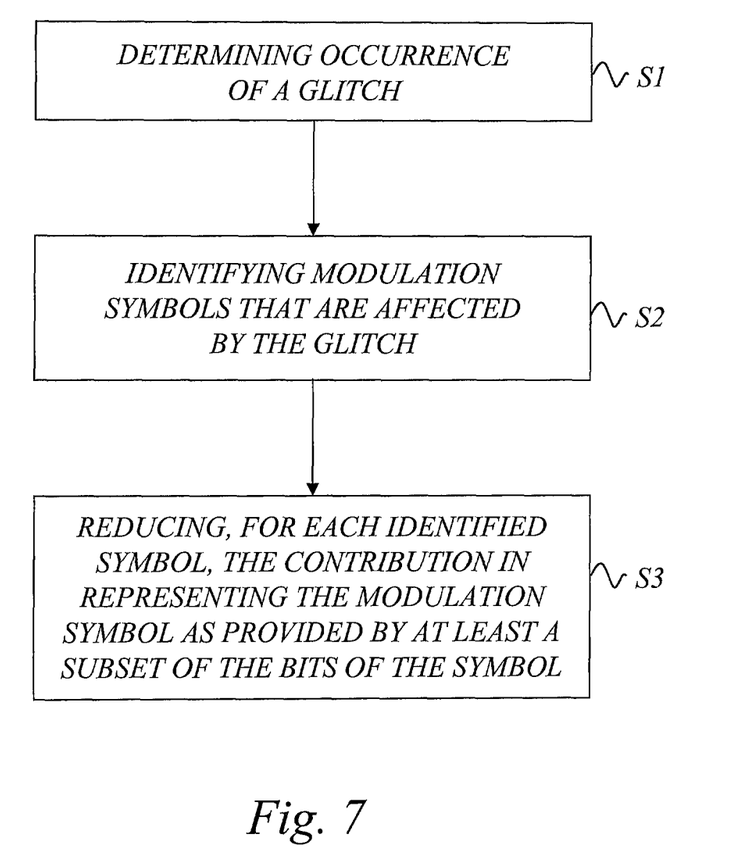
FIG. 7 is a schematic flow diagram illustrating a method for glitch mitigation according to an exemplary embodiment.

FIG. 7 is a schematic flow diagram illustrating a method for glitch mitigation according to an exemplary embodiment. Step S1 includes determining the occurrence of a glitch caused by operation of the AGC mechanism. Step S2 includes identifying those modulation symbols in a digitized version of the received signal that are affected by the glitch. Each modulation symbol may be represented by a number of bits in combination. Step S3 includes reducing, for each of the identified modulation symbols, the contribution in representing the identified modulation symbol as provided by at least a subset of the bits of the modulation symbol.

In an exemplary embodiment, the occurrence of a glitch is determined in response to an AGC adjustment of the AGC mechanism. In other words, when the AGC mechanism is turned on or off, and/or the gain is adjusted, it is concluded that a glitch will occur. In an alternative exemplary embodiment, the occurrence of a glitch is determined by a glitch detector arranged externally to the AGC mechanism.

Figure 8:
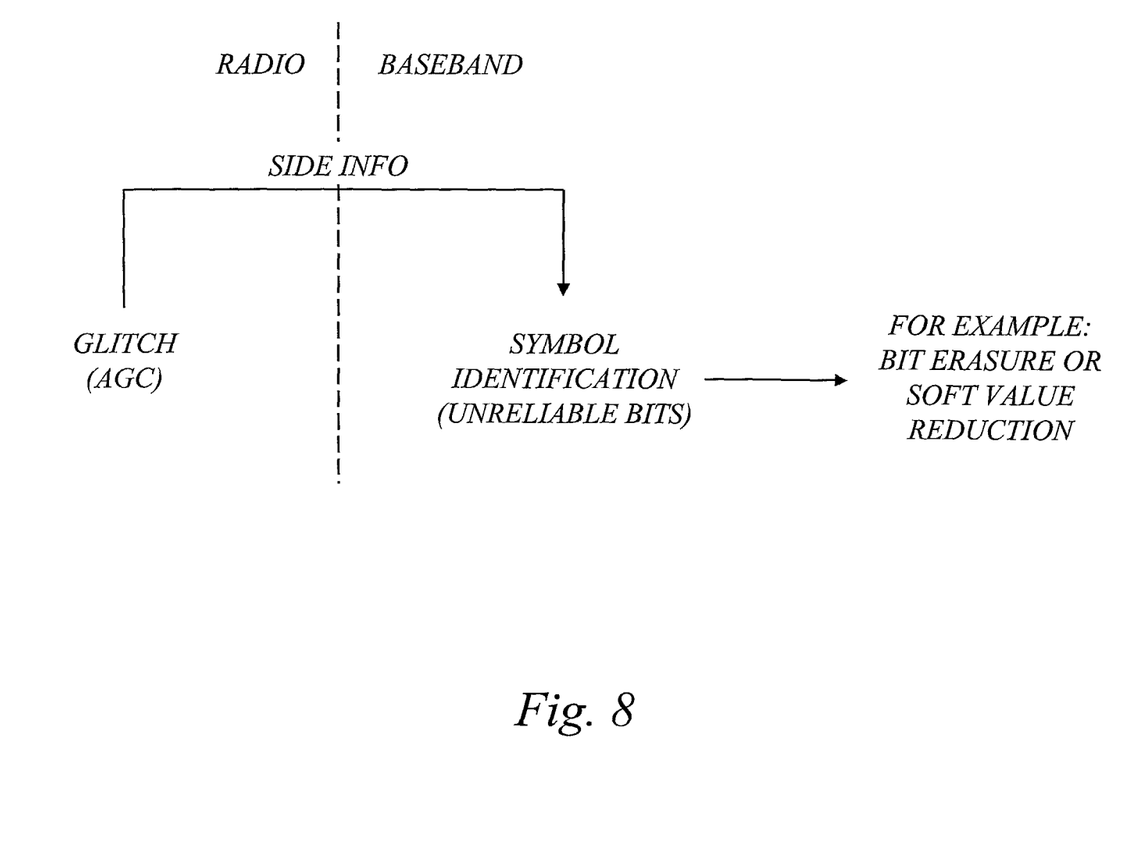
FIG. 8 is a schematic diagram illustrating the transfer of side information related to the occurrence of a glitch from the radio part to the baseband part, and the use of the side information for symbol identification according to an exemplary embodiment.

FIG. 8 is a schematic diagram illustrating the transfer side information related to the occurrence of a glitch from the radio part to the baseband part, and the use of the side information for symbol identification according to an exemplary embodiment. Preferably, it is desirable to determine time information corresponding to the occurrence of the glitch or equivalently sample information representative of those digital signal samples that are affected by the glitch in the radio part of the receiver and transfer this information as so-called side information to the baseband part of the receiver. The side information may also include additional information such as the delay of the samples from the radio part to the baseband part. This enables identification of those modulation symbols that are affected by the glitch so that appropriate actions may be taken to reduce the contribution of representing a modulation symbol as provided by at least a subset of the bits of the symbol. As mentioned, such actions may include bit erasure or soft value reduction.

Erasure of bits have been applied in the prior art in other applications of certain digital communications systems, in particular in combination with Reed-Solomon codes to improve the performance of the decoder. Bits should be erased if there is side information indicating that the corresponding modulated symbols are considered unreliable [3].

In the invention, the relevant side information is preferably determined as time information corresponding to the occurrence of the glitch or equivalently sample information representative of those digital signal samples that are affected by the glitch, and modulation symbols that are affected by the glitch may then be identified by logically mapping the time information from the time domain, or equivalently the sample information from the sample domain, into the symbol domain, as will be explained below.

Preferably, the side information is represented by time instants of gain adjustments of the AGC and the delay from gain adjustment to baseband. It is not necessarily so that all gain adjustments are of interest. For instance, when the gain is increased due to a decrease in received power, the AGC glitches are usually small and may be discarded.

Figure 9:
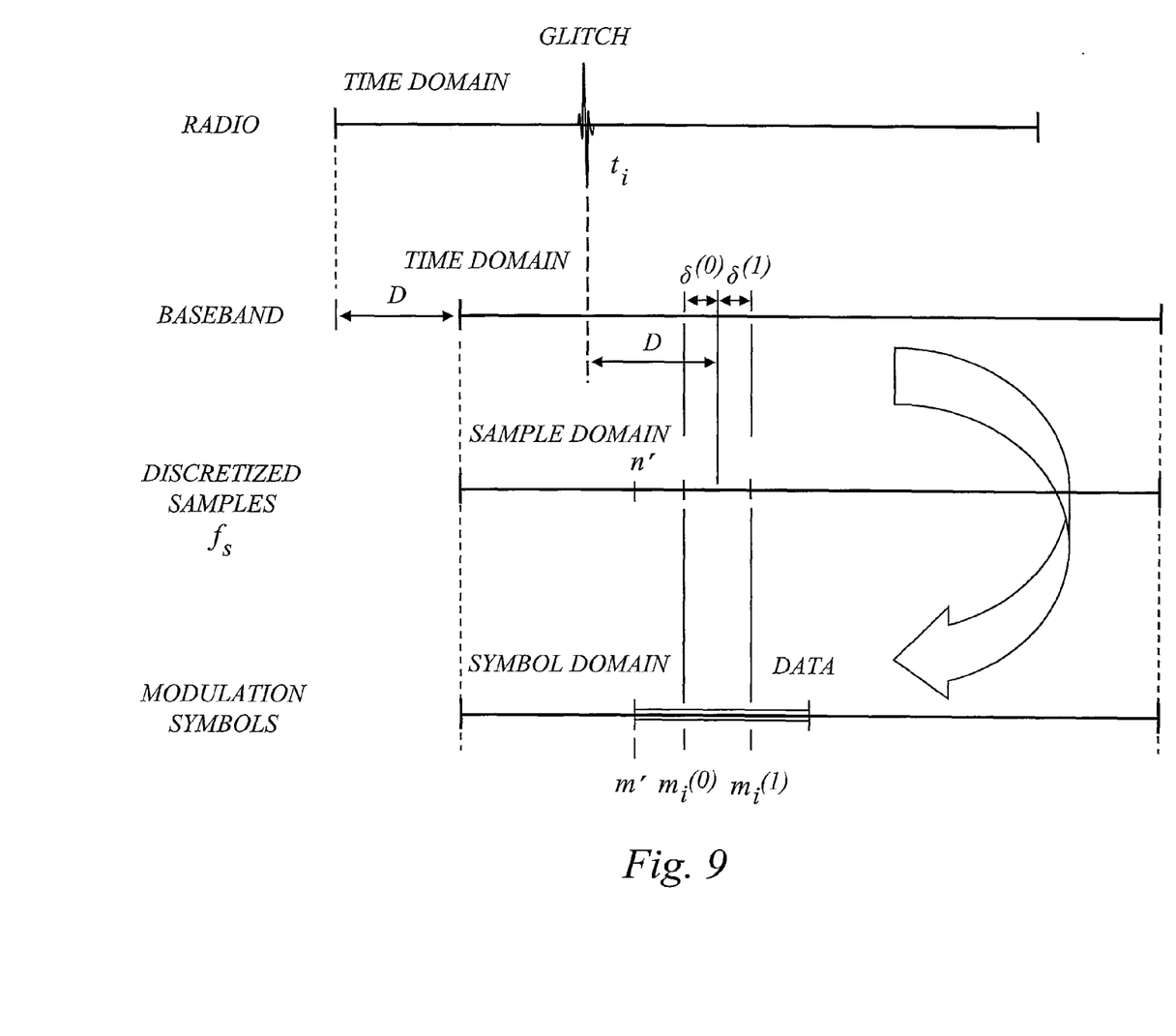
FIG. 9 is a schematic diagram illustrating an example of how the occurrence of a glitch can be mapped to the symbol domain for proper identification of which modulation symbols that are affected by the glitch according to an exemplary embodiment.

FIG. 9 is a schematic diagram illustrating an example of how the occurrence of a glitch can be mapped to the symbol domain for proper identification of which modulation symbols that are affected by the glitch according to an exemplary embodiment.

The time line at the top indicates the analog signal in the radio part of the receiver, illustrating the occurrence of a glitch. As mentioned, it is desirable to determine time information, $t_i$, corresponding to the occurrence of the glitch. D denotes a delay of the samples from the occurrence of the glitch in the radio part to the baseband part through the receiver chain in the radio receiver. Therefore, it is possible to represent the occurrence of the glitch also in baseband, using information on the delay D, as indicated in FIG. 9. The glitch may have a certain duration, or length, and the so-called spread of the glitch may be represented by the delay parameters $\delta^{(l)}$, l=0, 1. The glitch may equivalently be represented in the domain of discretized samples, i.e. the sample domain, determining sample information representative of those digital signal samples that are affected by the glitch. Those modulation symbols that are affected by the glitch may then be identified by logically mapping the time information from the time domain, or equivalently the sample information from the sample domain, into the symbol domain, as illustrated in FIG. 9.

With reference to the example of FIG. 9, it is possible to determine indices $m_i^{(l)}$, l=0, 1, of the first and last received modulated symbols affected by the glitch for each user i according to:

$$m_i^{(l)} = m' + \text{round}(((t_i + D + \delta^{(l)})f_s - n')N_u/N_s), l=0, 1,$$

where $t_i$ denotes time information corresponding to the occurrence of the glitch, D denotes a delay of the samples from the occurrence of the glitch in the radio part to the baseband part through the receiver chain in the radio receiver, $\delta^{(l)}$, l=0, 1 denote the delay parameters related to the spread of the glitch, $f_s$ is the sampling frequency, n' denotes the initial considered sample and m' denotes the modulation symbol associated with the initial considered sample, and $N_u/N_s$ denotes the inverse of the number of samples per symbol.

Those modulation symbols that are affected by the glitch are thus identified by index m such that $m_i^{(0)} \le m \le m_i^{(1)}$.

In a particular example, $t_i$ denotes the time instant for a gain adjustment of the AGC mechanism, and D denotes the delay of the samples from the gain adjustment to baseband through the receiver chain in the radio receiver.

By way of example, if data are handled in blocks, n' may denote the sample where a considered block of sample data begins, and $N_u$ is the number of modulated symbols in the block, and $N_s$ is the number of samples in the block.

As mentioned, at least a subset of the bits of an identified symbol may then be processed so that the contribution in representing the symbol as provided by the bits is reduced. This may e.g. involve bit erasure or soft value reduction. For example, at least some of the bits carried by the received modulated symbols affected, i.e. symbols with index m such that $m_i^{(0)} \le m \le m_i^{(1)}$, are erased, which may be achieved e.g. by setting the soft values to zero. It should be understood that bits may be erased also in receivers that do not use soft values.

Alternatively, for at least part of the bits, the absolute value of the corresponding soft values is attenuated by a time-varying factor $c_{m,k}$, where $0 \leq c_{m,k} \leq 1$:

$$s_{Mm+k} = c_{m,k} \tilde{s}_{Mm+k},\ m_i^{(0)} \leq m \leq m_i^{(1)},\ k=0, 1, \ldots, M-1,$$

where $\tilde{s}_{Mm+k}$ are the soft values before attenuation, and those modulation symbols that are affected by the glitch are identified by index m such that $m_i^{(0)} \leq m \leq m_i^{(1)}$, and M is the number of bits per symbol.

Figure 10:
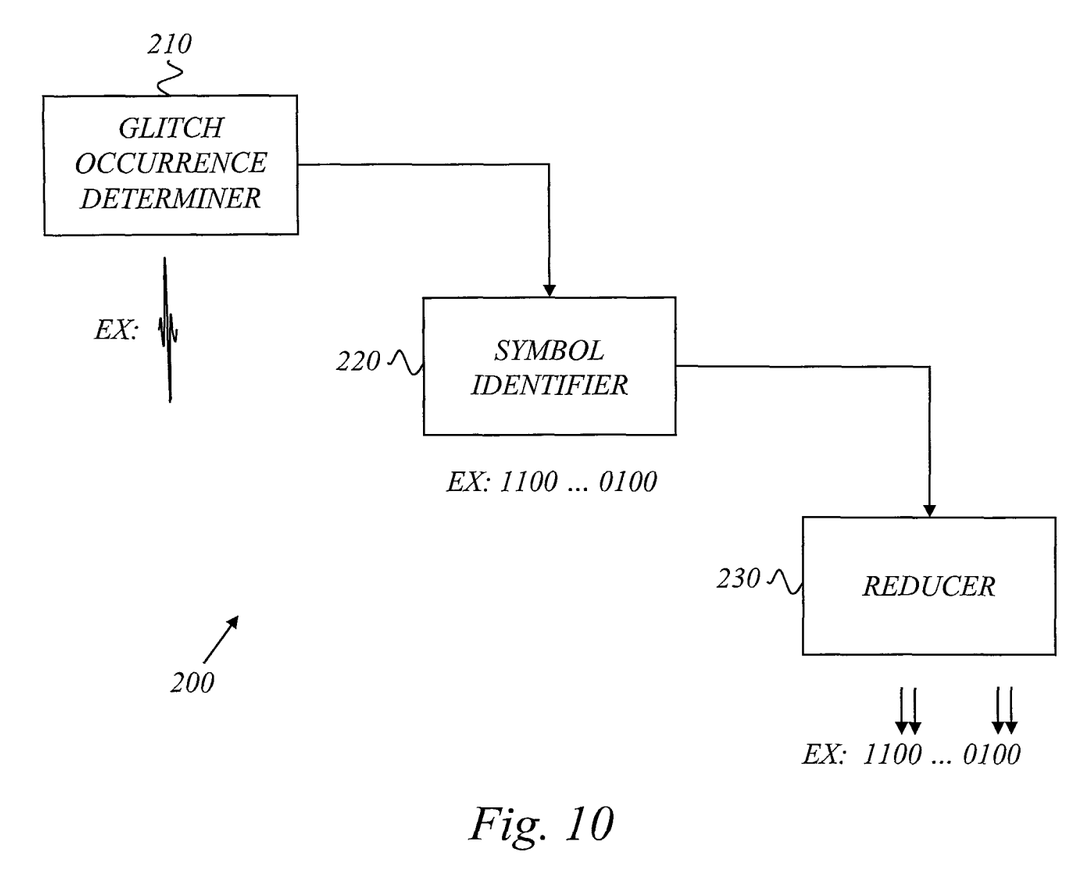
FIG. 10 is a schematic block diagram illustrating a device for glitch mitigation according to an exemplary embodiment.

FIG. 10 is a schematic block diagram illustrating a device for glitch mitigation according to an exemplary embodiment. Basically, the device 200 includes a determiner 210, a symbol identifier 220 and a reducer 230. The determiner 210 is configured to determine occurrence of a glitch caused by operation of the AGC mechanism. The symbol identifier 220 is configured to identify those modulation symbols in a digitized version of the received signal that are affected by the glitch, each modulation symbol represented by a number of bits in combination. The reducer 230 is configured to reduce, for each of the identified modulation symbols, the contribution in representing the identified modulation symbol as provided by at least a subset of the bits of the modulation symbol.

The determiner 210 may for example be configured to determine occurrence of a glitch in response to a gain adjustment of the AGC mechanism, and to transfer information representative of the occurrence of a glitch to the symbol identifier 220.

Alternatively, the determiner 210 includes a glitch detector arranged externally to the AGC mechanism, and the glitch detector is configured to transfer information representative of detection of a glitch to the symbol identifier 220.

In an exemplary embodiment, the determiner 210 is configured to determine time information corresponding to the occurrence of the glitch or equivalently sample information representative of those digital signal samples that are affected by the glitch. The symbol identifier 220 is configured to identify modulation symbols that are affected by the glitch by logically mapping the time information from the time domain, or equivalently the sample information from the sample domain, into the symbol domain.

Preferably, the determiner 210 is configured to determine information representative of a time instant of a gain adjustment of the AGC mechanism, and the symbol identifier 220 is configured to identify those modulation symbols that are affected by the glitch based on the information representative of a time instant of a gain adjustment.

In an exemplary embodiment, the symbol identifier 220 is configured to determine indices $m_i^{(l)}$, l=0, 1, of the first and last received modulated symbols affected by the glitch for each user i according to:

$$m_i^{(l)} = m' + \text{round}(((t_i + D + \delta^{(l)})f_s - n')N_u/N_s),\ l=0, 1,$$

where $t_i$ denotes time information corresponding to the occurrence of the glitch, D denotes a delay of the samples from the occurrence of the glitch in the radio part to the baseband part through the receiver chain in the radio receiver, $\delta^{(l)}$, l=0, 1 denote delay parameters related to the spread of the glitch, $f_s$, is the sampling frequency, n' denotes the initial considered sample and m' denotes the modulation symbol associated with the initial considered sample, $N_u/N_s$ denotes the inverse of the number of samples per symbol, and wherein those modulation symbols that are affected by the glitch are identified by index m such that $m_i^{(0)} \leq m \leq m_i^{(1)}$.

The reducer 230 is preferably configured to erase, for each of the identified modulation symbols, at least a subset of the bits of the identified modulation symbol.

Alternatively, the reducer 230 is configured to reduce, for each of the identified modulation symbols, the absolute value of corresponding soft value(s) of at least a subset of the bits of the identified modulation symbol, where each one of said bits is associated with a soft value representative of the reliability of the bit.

The reducer 230 may be configured to attenuate, for at least part of the bits, the absolute value of the corresponding soft values by a time-varying factor $c_{m,k}$, where $0 \leq c_{m,k} \leq 1$:

$$s_{Mm+k} = c_{m,k} \tilde{s}_{Mm+k},\ m_i^{(0)} \leq m \leq m_i^{(1)},\ k=0, 1, \ldots, M-1,$$

where $\tilde{s}_{Mm+k}$ are the soft values before attenuation, and those modulation symbols that are affected by the glitch are identified by index m such that $m_i^{(0)} \leq m \leq m_i^{(1)}$, and M is the number of bits per symbol. The reducer may also be configured to reduce, for at least part of the bits, the absolute value of the corresponding soft values to zero, effectively corresponding to bit erasure.

Optionally, the device further comprises a processing unit configured to process the glitch by damping part of the received signal affected by the glitch. This may for example be the glitch suppression circuitry of reference [1].

Figure 11:
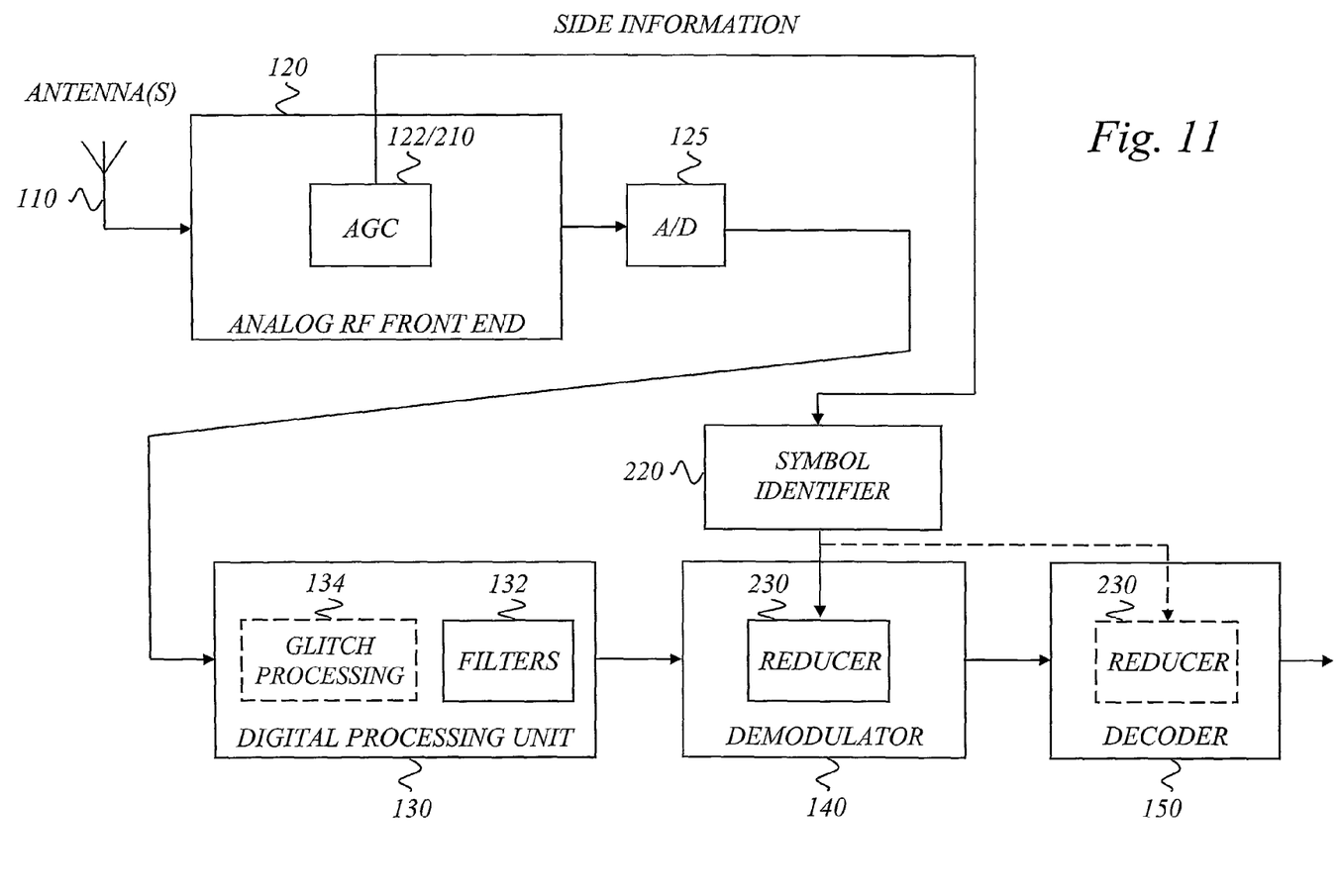
FIG. 11 is a schematic block diagram illustrating a radio receiver according to an exemplary embodiment.

FIG. 11 is a schematic block diagram illustrating a radio receiver according to an exemplary embodiment. Basically, the radio receiver comprises a set of one or more antennas 110, an analog radio frequency (RF) front end 120, and A/D-converter or ADC 125, a digital processing unit 130, a demodulator 140, a decoder 150, and a symbol identifier 220.

In addition to standard amplifiers, filters and mixers (not shown), the analog RF front end includes an AGC mechanism 122 for moving the input signal into the appropriate dynamic range. In this particular example, when an AGC adjustment occurs, so-called side information indicating the occurrence of a glitch is transferred from AGC mechanism 122 to the symbol identifier 220. The side information may for example be time information corresponding to the occurrence of the glitch, or a glitch flag corresponding to each sample that is affected by the glitch. In the example of FIG. 11, the determiner 210 of FIG. 10 is embedded in the AGC mechanism 122.

The ADC 125 is adapted for converting the output signals from the analog RF front end 120 into digital form.

The digital processing unit 130 includes one or more digital filters 132 in the output path of the ADC 125, and an optional glitch processing unit 134.

The optional glitch processing unit 134 is configured to process the glitch, and may effectuate some form of glitch damping or glitch suppression.

The symbol identifier 220 is configured to identify those modulation symbols that are affected by the glitch based on the side information received from the AGC mechanism.

Information on the identified symbols is transferred from the symbol identifier 220 to the reducer 230, which is configured to reduce, for each of the identified modulation symbols, the contribution in representing the identified modulation symbol as provided by at least a subset of the bits of the symbol.

The reducer 230 may be integrated in the demodulator 140. Alternatively, the reducer 230 is implemented in the decoder 150 or between the demodulator 140 and the decoder 150. The decoder 150 will then perform conventional decoding based on the information received from the demodulator 140 and reducer 230. This means that the absolute value of soft values corresponding to at least part of the bits of affected modulation symbols may have been reduced or unreliable bits may have been erased completely, when the digitally represented symbols are processed in the decoder 150. In this way, the performance of the decoder 150 and the detection of the desired signal will be significantly improved.

Figure 12:
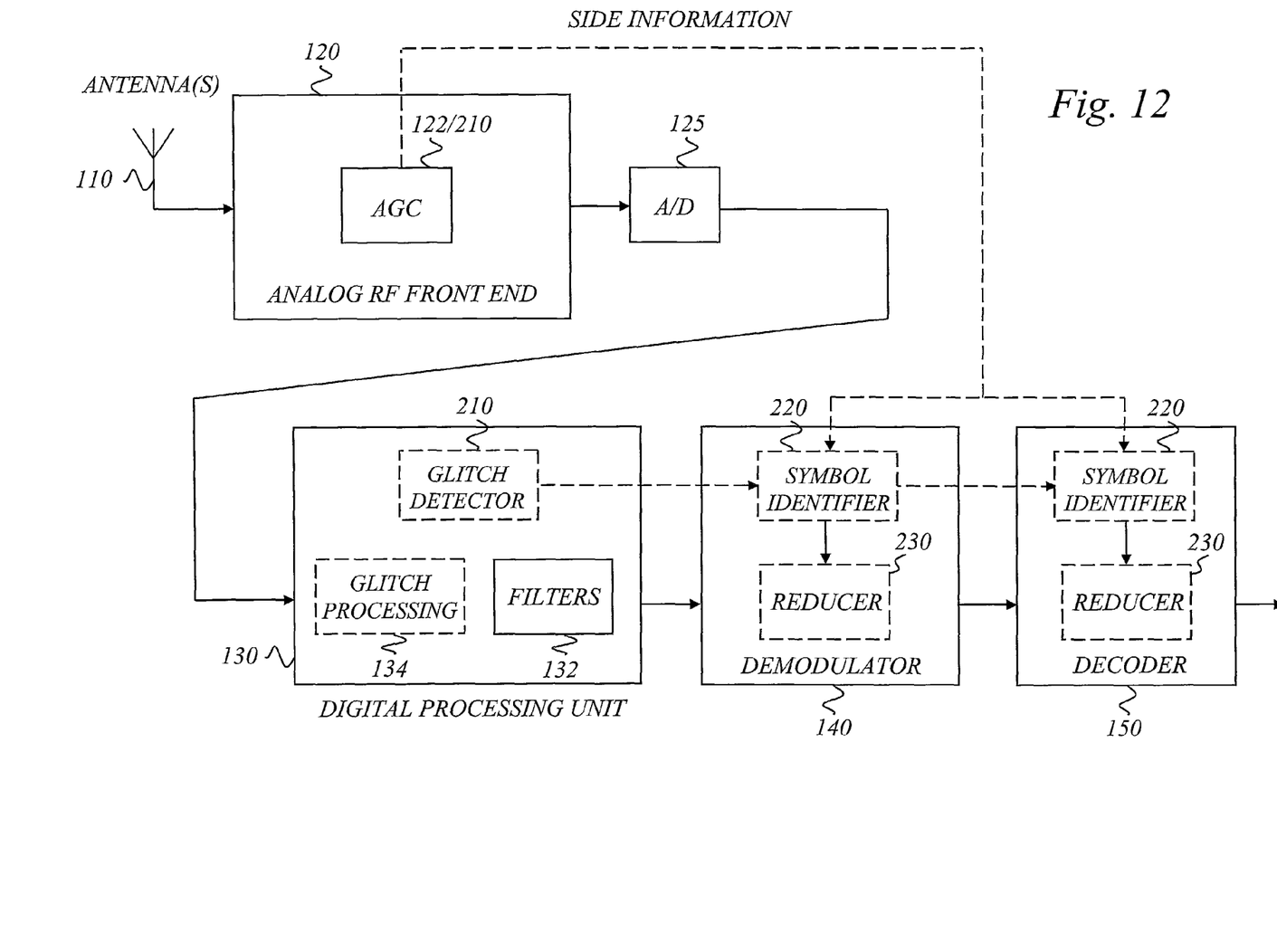
FIG. 12 is a schematic block diagram illustrating a radio receiver according to another exemplary embodiment.

FIG. 12 is a schematic block diagram illustrating a radio receiver according to another exemplary embodiment. In this particular example, the alternative possibility of using an external glitch detector for determining the occurrence of a glitch is illustrated. For example, a glitch detector 210 may be implemented in the digital processing unit 130. The glitch detector 210 is typically configured to transfer information representative of detection of the occurrence of a glitch to the symbol identifier. It is also indicated in FIG. 12, that the symbol identifier 220 may be implemented in the demodulator 140 or in the decoder 150.

The invention significantly improves the performance of the receiver for higher order modulation schemes, such as higher order QAM in presence of strong interference. The invention is especially useful in single-carrier systems, such as Long Term Evolution (LTE) Up Link (UL), Single Carrier Frequency Division Multiple Access (SC-FDMA), Wideband Code Division Multiple Access (WCDMA), and Global System for Mobile communications (GSM).

The invention is generally applicable for handling signal transients associated with glitches caused by AGC operation. However, the proposed technology may be of particular interest for improved detection of narrowband signals received through a wideband radio receiver. For example, the narrowband signal may be a GSM signal received through a wideband radio receiver capable of receiving WCDMA or LTE radio signals.

In particular, the proposed technology may be of interest for Multi-Standard Radio (MSR). Multi-Standard Radio (MSR) technology is maturing rapidly. The MSR concept includes both existence of more than one communication standard and reception and transmission of multiple carriers in the same receiver and transmitter. Due to the advantages of co-existing radio technologies and migration from older to newer technologies, MSR will be deployed globally. In particular, a narrowband system like GSM, being the incumbent technology, will be deployed using wideband radios like WCDMA or LTE.

The functional blocks described above may be implemented in hardware using any conventional hardware technology such as Integrated Circuit (IC) technology. Alternatively, at least some of the functional blocks may be implemented in software for execution on suitable processing hardware such as a microprocessor or digital signal processor.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] U.S. Patent Application No. 61/155,671, filed Feb. 26, 2009.
[2] U.S. Pat. No. 7,315,578.
[3] George. C. Clark, Jr., and J. Bibb Cain, Sec. 8.4 in *Error-Correction Coding for Digital Communications*, New York: Plenum Press, 1981.

The invention claimed is:

1. A method for glitch mitigation in a receiver having an automatic gain control (AGC) mechanism for regulating a dynamic range of a received signal, comprising:
   determining occurrence of a glitch caused by operation of the AGC mechanism;
   identifying those modulation symbols in a digitized version of the received signal that are affected by the glitch, each modulation symbol represented by a number of bits in combination; and
   reducing, for each of the identified modulation symbols, a contribution in representing the identified modulation symbol as provided by at least a subset of the bits of the modulation symbol.

2. The method of claim 1, wherein said step of determining occurrence of a glitch is performed in response to a gain adjustment of the AGC mechanism.

3. The method of claim 1, wherein said step of determining occurrence of a glitch is performed by a glitch detector arranged externally to the AGC mechanism.

4. The method of claim 1, wherein said method further comprises a step of determining time information corresponding to the occurrence of the glitch or equivalently sample information representative of those digital signal samples that are affected by the glitch, and
   wherein said step of identifying those modulation symbols that are affected by the glitch comprises the step of identifying modulation symbols that are affected by the glitch by logically mapping said time information from the time domain, or equivalently said sample information from the sample domain, into the symbol domain.

5. The method of claim 4, wherein said step of determining time information corresponding to the occurrence of the glitch or equivalently sample information comprises the step of determining information representative of a time instant of a gain adjustment of the AGC mechanism, and said step of identifying those modulation symbols that are affected by the glitch is performed based on using the information representative of a time instant of a gain adjustment as side information.

6. The method of claim 4, wherein said step of identifying those modulation symbols that are affected by the glitch comprises the step of:
   determining indices $m_i^{(l)}$, $l=0, 1$, of the first and last received modulated symbols affected by the glitch for each user i according to:

$$m_i^{(l)} = m' + \text{round}(((t_i + D + \delta^{(l)})f_s - n')N_u/N_s), l=0,1,$$

where $t_i$ denotes time information corresponding to the occurrence of the glitch, D denotes a delay of the samples from the occurrence of the glitch in the radio part to the baseband part through a receiver chain in the radio receiver, $\delta^{(l)}$, $l=0, 1$ denote delay parameters related to the spread of the glitch, $f_s$ is the sampling frequency, n' denotes the initial considered sample and m' denotes the modulation symbol associated with the initial considered sample, $N_u/N_s$ denotes the inverse of the number of samples per symbol, and wherein those modulation symbols that are affected by the glitch are identified by index m such that $m_i^{(0)} \leq m \leq m_i^{(1)}$.

7. The method of claim 6, wherein $t_i$ denotes a time instant for a gain adjustment of the AGC mechanism, and D denotes the delay of the samples from the gain adjustment to baseband through the receiver chain in the radio receiver.

8. The method of claim 6, wherein n' denotes the sample where a considered block of sample data begins, $N_u$ is the number of modulated symbols in the block, and $N_s$ is the number of samples in the block.

9. The method of claim 1, wherein said step of reducing, for each of the identified modulation symbols, the contribution in representing the identified modulation symbol as provided by at least a subset of the bits of the modulation symbol includes the step of erasing, for each of the identified modulation symbols, at least a subset of the bits of the identified modulation symbol.

10. The method of claim 1, wherein each one of said bits is associated with a soft value representative of a reliability of the bit, and said step of reducing, for each of the identified modulation symbols, the contribution in representing the identified modulation symbol as provided by at least a subset of the bits of the modulation symbol includes the step of reducing, for each of the identified modulation symbols, an absolute value of corresponding soft value(s) of at least a subset of the bits of the identified modulation symbol.

11. The method of claim 10, wherein said step of reducing, for each of the identified modulation symbols, the absolute value of the corresponding soft value(s) of at least a subset of the bits of the identified modulation symbol includes the step of attenuating, for at least part of the bits, the absolute value of the corresponding soft values by a time-varying factor $c_{m,k}$, where $0 \leq c_{m,k} \leq 1$:

$$s_{Mm+k} = c_{m,k} \tilde{s}_{Mm+k}, \; m_i^{(0)} \leq m \leq m_i^{(1)}, k=0,1,\ldots,M-1,$$

where $\tilde{s}_{Mm+k}$ are the soft values before attenuation, and those modulation symbols that are affected by the glitch are identified by index m such that $m_i^{(0)} \leq m \leq m_i^{(1)}$, and M is the number of bits per symbol.

12. The method of claim 10, wherein, for at least part of the bits, the absolute value of the corresponding soft values are reduced to zero, effectively corresponding to bit erasure.

13. The method of claim 1, wherein said method further comprises the step of processing the glitch by damping part of the received signal affected by the glitch.

14. A device for glitch mitigation in a receiver having an automatic gain control (AGC) mechanism for regulating a dynamic range of a received signal, comprising:
 a determiner configured to determine occurrence of a glitch caused by operation of the AGC mechanism;
 a symbol identifier configured to identify those modulation symbols in a digitized version of the received signal that are affected by the glitch, each modulation symbol represented by a number of bits in combination; and
 a reducer configured to reduce, for each of the identified modulation symbols, a contribution in representing the identified modulation symbol as provided by at least a subset of the bits of the modulation symbol.

15. The device of claim 14, wherein said determiner is configured to determine occurrence of a glitch in response to a gain adjustment of the AGC mechanism, and to transfer information representative of the occurrence of a glitch to said symbol identifier.

16. The device of claim 14, wherein said determiner includes a glitch detector arranged externally to the AGC mechanism, and said glitch detector is configured to transfer information representative of detection of a glitch to said symbol identifier.

17. The device of claim 14, wherein said determiner is configured to determine time information corresponding to the occurrence of the glitch or equivalently sample information representative of those digital signal samples that are affected by the glitch, and
 wherein said symbol identifier is configured to identify modulation symbols that are affected by the glitch by logically mapping said time information from the time domain, or equivalently said sample information from the sample domain, into the symbol domain.

18. The device of claim 17, wherein said determiner is configured to determine information representative of a time instant of a gain adjustment of the AGC mechanism, and said symbol identifier is configured to identify those modulation symbols that are affected by the glitch based on the information representative of a time instant of a gain adjustment.

19. The device of claim 17, wherein said symbol identifier is configured to determine indices $m_i^l$, $l=0, 1$, of the first and last received modulated symbols affected by the glitch for each user i according to:

$$m_i^{(l)} = m' + \text{round}(((t_i + D + \delta^{(l)})f_s - n')N_u/N_s), \; l=0,1,$$

where $t_i$ denotes time information corresponding to the occurrence of the glitch, D denotes a delay of the samples from the occurrence of the glitch in the radio part to the baseband part through the receiver chain in the radio receiver, $\delta^{(l)}$, $l=0, 1$ denote delay parameters related to the spread of the glitch, $f_s$ is the sampling frequency, n' denotes the initial considered sample and m' denotes the modulation symbol associated with the initial considered sample, $N_u/N_s$, denotes the inverse of the number of samples per symbol, and wherein those modulation symbols that are affected by the glitch are identified by index m such that $m_i^{(0)} \leq m \leq m_i^{(1)}$.

20. The device of claim 14, wherein said reducer is configured to erase, for each of the identified modulation symbols, at least a subset of the bits of the identified modulation symbol.

21. The device of claim 14, wherein said reducer is configured to reduce, for each of the identified modulation symbols, an absolute value of corresponding soft value(s) of at least a subset of the bits of the identified modulation symbol, where each one of said bits is associated with a soft value representative of the reliability of the bit.

22. The device of claim 21, wherein said reducer is configured to attenuate, for at least part of the bits, the absolute value of the corresponding soft values by a time-varying factor $c_{m,k}$, where $0 \leq c_{m,k} \leq 1$:

$$s_{Mm+k} = c_{m,k} \tilde{s}_{Mm+k}, \; m_i^{(0)} \leq m \leq m_i^{(1)}, k=0,1,\ldots,M-1,$$

where $\tilde{s}_{Mm+k}$ are the soft values before attenuation, and those modulation symbols that are affected by the glitch are identified by index m such that $m_i^{(0)} \leq m \leq m_i^{(1)}$, and M is the number of bits per symbol.

23. The device of claim 21, wherein said reducer is configured to reduce, for at least part of the bits, the absolute value of the corresponding soft values to zero, effectively corresponding to bit erasure.

24. The device of claim 14, wherein said device further comprises a processing unit configured to process the glitch by damping part of the received signal affected by the glitch.

25. A radio receiver comprising a device of claim 14.

* * * * *